United States Patent
Savage et al.

(10) Patent No.: US 8,107,501 B2
(45) Date of Patent: *Jan. 31, 2012

(54) SYNCHRONIZING PORTIONS OF A DATABASE WITH DIFFERENT DATABASES ON DIFFERENT NODES OF A NETWORK

(75) Inventors: Donnie V. Savage, Research Triangle Park, NC (US); Thuan Van Tran, Raleigh, NC (US); Russell I. White, Holly Springs, NC (US); Liem H. Nguyen, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/349,394

(22) Filed: Jan. 6, 2009

(65) Prior Publication Data

US 2009/0116496 A1    May 7, 2009

Related U.S. Application Data

(63) Continuation of application No. 10/353,401, filed on Jan. 28, 2003, now Pat. No. 7,515,600.

(51) Int. Cl.
*H04J 3/06* (2006.01)
(52) U.S. Cl. ........................................ 370/503
(58) Field of Classification Search .......... 370/216–220, 370/350, 351, 389, 395.31, 395.62, 400, 370/503, 509, 510, 512
See application file for complete search history.

(56) References Cited

U.S. PATENT DOCUMENTS

| | | | |
|---|---|---|---|
| 5,881,243 A | | 3/1999 | Zaumen et al. |
| 6,611,835 B1* | | 8/2003 | Huang et al. ............... 707/10 |
| 6,820,120 B1* | | 11/2004 | Keats et al. ................ 709/223 |
| 6,944,131 B2 | | 9/2005 | Beshai et al. |
| 2002/0131362 A1* | | 9/2002 | Callon ..................... 370/216 |
| 2002/0167898 A1 | | 11/2002 | Thang et al. |
| 2002/0181409 A1* | | 12/2002 | Shen ....................... 370/252 |
| 2003/0028817 A1* | | 2/2003 | Suzuyama et al. ............. 714/4 |
| 2003/0031180 A1* | | 2/2003 | Datta et al. ................ 370/392 |
| 2004/0090913 A1 | | 5/2004 | Scudder et al. |
| 2004/0260834 A1 | | 12/2004 | Lindholm et al. |

OTHER PUBLICATIONS

David Ward, Cisco Systems, "Routing/Signalling Non-Stop Forwarding and Increased Network and Node Availability," Feb. 2002, 125 pages.

* cited by examiner

*Primary Examiner* — Kwang B Yao
*Assistant Examiner* — Tung Q Tran
(74) *Attorney, Agent, or Firm* — Hickman Palermo Truong & Becker LLP (57) ABSTRACT

Techniques are disclosed for synchronizing a database related to a first node in a network with multiple nodes. Each node includes a database different from a database on a different node. An inquiry control message is sent to each node in a candidate set of one or more nodes on the network, which are different from the first node. In response to the inquiry control message, the first node receives a first set of one or more messages from a particular node different from the first node. The first set indicates a portion from the database of the particular node. The portion is relevant for the first node. A particular portion of a first database for the first node is derived from the first set of messages. The particular portion is less than all of the first database. These techniques allow the first node to derive its full database from multiple adjacent nodes.

44 Claims, 6 Drawing Sheets

SYNCHRONIZING PORTIONS OF A DATABASE WITH DIFFERENT DATABASES ON DIFFERENT NODES OF A NETWORK

BENEFIT CLAIM PRIORITY CLAIM

This application claims the benefit under 35 U.S.C. 120 as a Continuation of prior application Ser. No. 10/353,401, filed Jan. 28, 2003, now U.S. Pat. No. 7,515,600 the entire contents of which is hereby incorporated by reference for all purposes as if fully set forth herein.

FIELD OF THE INVENTION

The present invention generally relates to synchronizing data that is distributed over different nodes of a network. The invention relates more specifically to synchronizing portions of a database with different databases on different nodes of a network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art merely by inclusion in this section.

In some communication networks, routers transfer data packets between edges of a network. A router receives a data packet that indicates a destination for the data packet and forwards the data packet to an adjacent router associated with the destination. Each router maintains a routing database, sometimes called a "routing table" or "routing information base" (RIB). The routing database associates each destination with one or more adjacent routers. In some routing databases, the routing database includes a measure of the cost of using a particular adjacent router to reach a particular destination. The router selects an adjacent router based on the information in the routing database and forwards the data packet to the selected router. The data in the routing database is used to control the transfer of data packets through the router.

As routers join or leave the communication network, the data in the routing database at affected routers is updated. Various protocols are available for maintaining and updating the information in the routing database. For example, known protocols for maintaining and updating routing databases include Open Shortest Path First (OSPF) protocol, an Interior Gateway Routing Protocol (IGRP) and Enhanced Interior Gateway Routing Protocol (EIGRP), among others. The process of joining or leaving a network involves a large number of communications among the routers to determine which routers are used to forward data packets headed for different destinations on the edge of the network, to determine the cost of using that router for that destination, and to update the routing database at each affected router.

Control messages sent among the routers according to one or more of the routing protocols are processed in a control plane processor in the router, and switching of data packets between two interfaces on an individual router is performed in a data plane processor. Changes to the routing database are determined in the control plane and stored in the routing database, which is used to configure the data plane.

A failure can be experienced in the control plane even when there is no failure in the data plane. The failure in the control plane can be caused by a variety of circumstances. For example, a failure in the control plane might be caused by receiving a protocol message that causes the control plane to shut down or erase some or all of the routing database, by a hardware failure in the control plane processor, by a failure in memory storing the routing database, or by a software failure in the instructions executed in the control plane processor, among other causes. There is a need in such circumstances for the data plane to continue forwarding data packets while the control plane is restarted, or repaired or replaced.

In one approach, a second, standby control plane processor is included in each router, so that if an equipment failure occurs in one control plane, the standby control plane can assume control plane duties automatically. According to an aspect of this approach, which is termed a "stable switchover" (SSO) or "non-stop forwarding" (NSF) approach, during the switch of control planes at a router, the data plane of the router continues to forward packets according to the old routing database. During this time, the router is incapable of responding to changes in the network topology, such as changes caused by the addition or removal of a node in the network. After a control plane is restored for the router, the control messages are used to update the database at the router and make any changes to the data plane reflected in the restored routing database.

Whether a second control plane processor replaces a failed control plane processor, or whether a control plane processor that temporarily stopped functioning begins to function again, the routing database available to the control plane is then restored. It is desirable to restore the routing database on the router without consuming resources at routers all over the network that are involved in logically rediscovering the routes and costs that go through the restored router, such as by logically removing the router and then logically adding the router to the network.

In one approach, as used by the OSPF protocol, each router maintains a copy of a complete routing database in the control plane. When a router switches or restarts a control plane processor, one or more of the neighbors to that router in the network sends the complete routing database to the control plane. In this manner, the routers on the network avoid consuming resources to logically rediscover the routes going through that router.

While useful for many purposes, the approach of storing a routing database for the whole network at every node and sending the whole routing database to the router with the new or restarting control plane suffers some disadvantages. One disadvantage is that each router consumes considerable resources to store and update excess routing database information for routers that make no difference to the data packet forwarding that occurs in its own data plane processor. Another disadvantage is that network bandwidth is consumed to send excess information to the router that switches or restarts a control plane processor.

In one approach, the amount of excess information communicated over the bandwidth available to the nodes is reduced by updating the routing databases intermittently, not after each change to any piece of the database. This approach is called "checkpointing." While checkpointing can reduce the amount of bandwidth consumed, it does have some disadvantages. One disadvantage is that a control plane restarts in a time window after a change is made to a database and before the change is communicated at a scheduled checkpointing event, then the restarting control plane may receive incorrect information that may affect the routes it is using.

According to EIGRP, each router stores a different routing database that includes only routing information used by the data plane on that router. This protocol does not force routers to consume resources for excess information. However, early versions of EIGRP that provide NSF for a router that temporarily loses its control plane processor do not provide techniques to avoid having the control plane instigate a process that consumes resources at nodes across the network to rediscover the routes through the restarting router.

Based on the foregoing, there is a clear need for a version of EIGRP that restores the routing database for a router with a new or restarted control plane without consuming excess resources.

More generally, there is a need for synchronizing portions of a database relevant for a particular node in a network with different databases on different nodes that does not suffer the disadvantages of the approaches described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for synchronizing portions of a database with different databases on different nodes of a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
  2.1 Network Structures
  2.2 Restarting Router Structures
  2.3 Functional Overview
3.0 Method of Synchronizing Databases
  3.1 Exchanging Relevant Portions of Databases
  3.2 Process of Restarting a Control Plane at a Router
  3.3 Process of Responding to a Restarting Control Plane at an Adjacent Router
4.0 Implementation Mechanisms-Hardware Overview
5.0 Extensions and Alternatives

---

1.0 General Overview

The needs identified in the foregoing Background, and other needs and objects that will become apparent for the following description, are achieved in the present invention, which comprises, in one aspect, a method for synchronizing a database related to a first node in a network that has multiple nodes. Each node includes a database different from a database on a different node. An inquiry control message is sent to each node in a candidate set of one or more nodes on the network, which are different from the first node. In response to the inquiry control message, the first node receives a first set of one or more messages from a particular node different from the first node. The first set indicates a portion from the database of the particular node. The portion is relevant for the first node. A particular portion of a first database for the first node is derived from the first set of messages. The particular portion is less than the entire first database.

In other aspects, the invention encompasses a computer apparatus and a computer readable medium, including a carrier wave, configured to carry out the foregoing steps.

These techniques allow the first node to derive its full database from messages sent from multiple adjacent nodes.

In the following descriptions, embodiments of the invention are described in the context of modifying a particular router protocol, EIGRP, in a minimal way, to accommodate a restarting control plane at one router without having multiple routers go active to discover routes to multiple terminals. Normally, multiple routers go active to discover routes to multiple terminals when new routers join or existing routers exit the network.

However, embodiments of the invention are not limited to this context. In other embodiments, other protocols can be modified or generated, for other networks with distributed data. In some such embodiments, a protocol is generated for synchronizing enterprise data distributed on a network of nodes, in which different parts of the enterprise data reside on different nodes of the network. In such an embodiment, it is anticipated that the enterprise data on a particular node can be derived from portions of the enterprise data that reside on several other nodes.

For example, an enterprise, with nodes at multiple outlets, inserts sales records for sales at each outlet in a database on the node at that outlet. Each node redundantly inserts, in a second database on a node at one neighboring outlet, records for sales made on even dates, and redundantly inserts, in a third database on a node at a second neighboring outlet, records for sales made on odd dates. Then, if the database at its own node is lost, the database is reconstructed from the even dates in the second database on one neighbor node and the odd dates in the third database on the other neighbor.

2.0 Structural and Functional Overview

Structural and functional overviews of embodiments of the invention are provided in the following with reference to FIG. 1 and FIG. 2.

2.1 Network Structures

Figure 1:
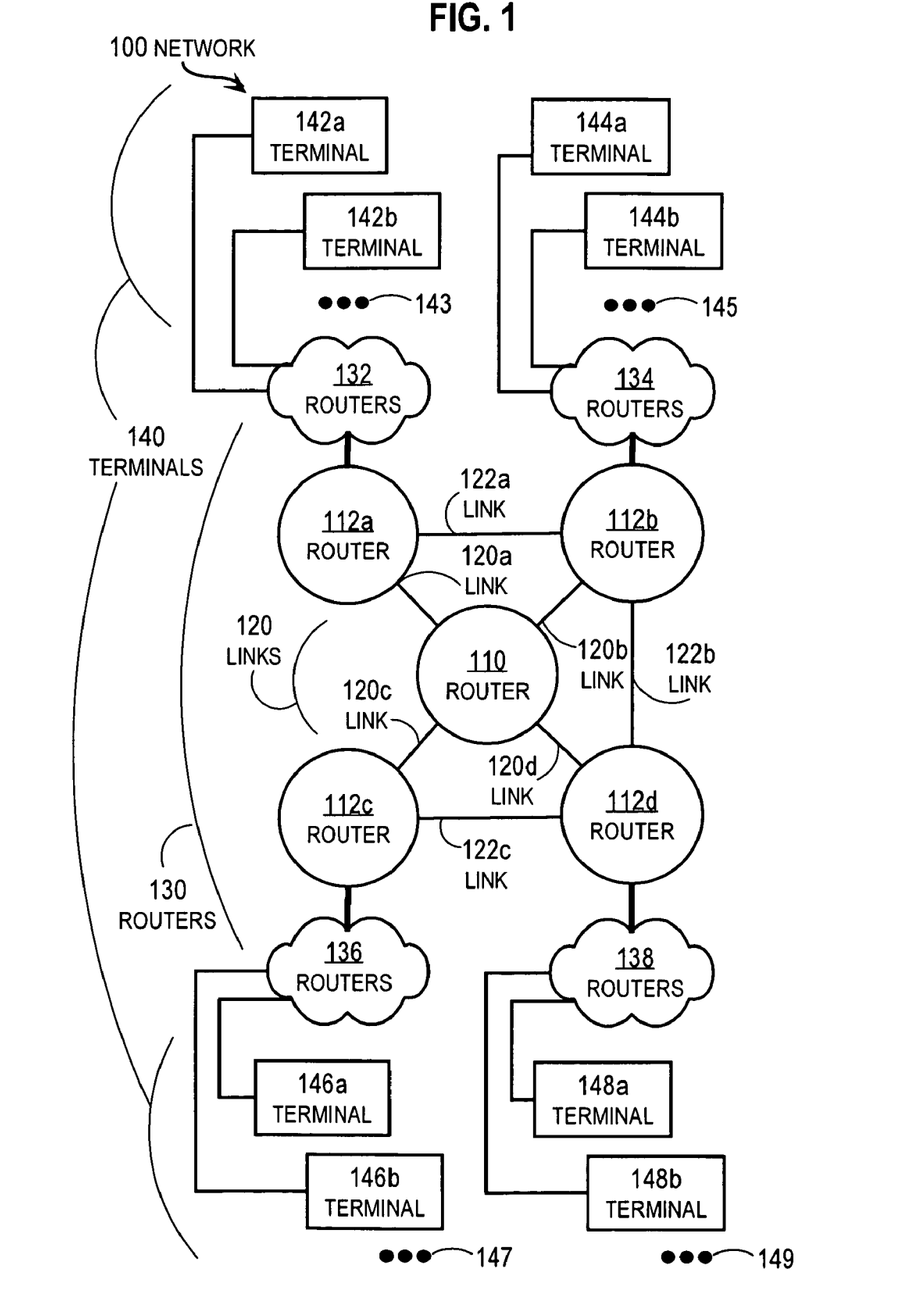
FIG. 1 is a block diagram that illustrates an overview of a network with multiple routers supporting multiple routes to multiple terminals.

FIG. 1 is a block diagram that illustrates an overview of an example network 100 with multiple routers 130 supporting multiple routes to multiple terminals 140. Certain embodiments are described below with reference to the example network 100. In other embodiments, other networks with other arrangements of nodes and terminals are involved. In some embodiments, the nodes of the network are not routers, but are other devices that perform various network services, such as database servers.

The network 100 includes multiple routers 130 that interconnect multiple terminal nodes 140 on the edge of the network 100. For example, zero or more routers 132 connect to terminals 142a, 142b and zero or more additional terminals indicated by ellipsis 143. Similarly, zero or more routers 134 connect to terminals 144a, 144b and zero or more additional terminals indicated by ellipsis 145; zero or more routers 136 connect to terminals 146a, 146b and zero or more additional terminals indicated by ellipsis 147; and, zero or more routers 138 connect to terminals 148a, 148b and zero or more additional terminals indicated by ellipsis 149.

The routers 130 include individual routers 110, 112a, 112b, 112c, 112d. Routers 130 are linked directly to adjacent routers through one or more links 120. For example, router 110 is linked to router 112a through link 120a; is linked to router 112b through link 120b; is linked to router 112c through link 120c; and is linked to router 112d through link 120d. Each link 120 connects an interface on one router with an interface on another router.

Each router receives a data packet that indicates a destination terminal from an adjacent terminal or an adjacent router, and sends the data packet toward the destination terminal along a link to another adjacent router or to the destination terminal. A database stored on each router associates a destination terminal with an interface and hence with a link to an adjacent router or terminal. In some networks, the routers also associate a cost of reaching the destination along that link in the database. In some embodiments, the cost is expressed as a number of hops among adjacent routers involved in traversing from the router to the destination.

2.2 Restarting Router Structures

Figure 2:
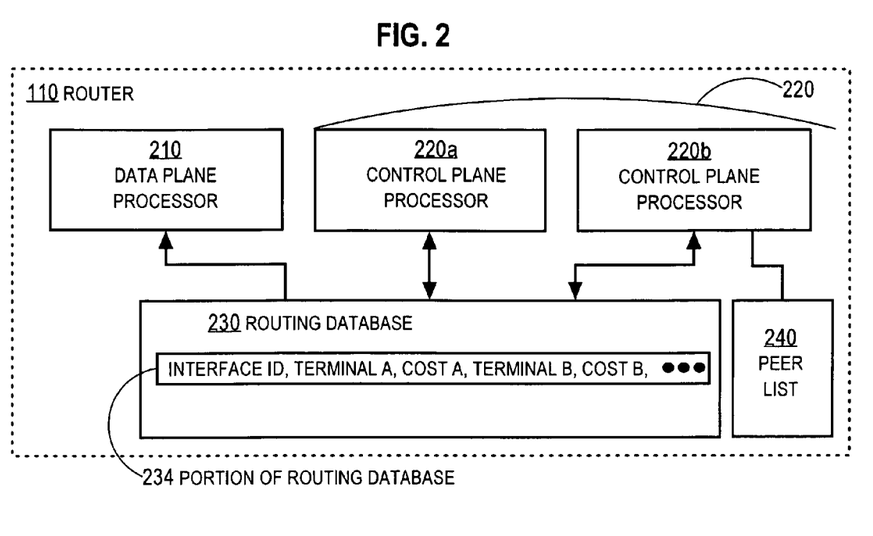
FIG. 2 is a block diagram that illustrates a router with two control plane processors, according to an embodiment.

FIG. 2 is a block diagram that illustrates router 110 with a restarting control plane processor, according to an embodiment. Router 110 includes a data plane processor, a routing table 230, control plane processors 220, including control plane processor 220a and control plane processor 220b, and a peer list data structure 240.

The data plane processor 210 processes data packets received on any link. According to the contents of the data packet, the logic implemented in the processor, and the contents of the routing database 230, the data plane processor may ignore the data packet, may direct the data packet to one of the control plane processors 220, may send the data packet out along a different link, or may generate a different data packet to send out along any link.

An active one of the control plane processors 220 processes control messages directed to the control plane processor by the data plane processor. In many routers, there is only one control plane processor 220. In embodiments that support NSF, there are two or more control plane processors 220, and only one control plane processor 220 is active. For example, control plane processor 220a is active and control plane processor 220b is dormant. If the active control plane processor fails, a dormant control plane processor assumes the functions of the failed processor.

One function of the active control plane processor is to maintain the routing database 230. The active control plane processor updates the routing database 230 when control packets are received which indicate that the destinations that can be reached from the router 110 or the cost of reaching any of those destinations changes.

The routing database 230 includes data that indicates a destination terminal and a link to an adjacent router or terminal that leads to that destination. In the illustrated embodiment, routing database 230 also includes data that indicates a cost of reaching the destination using that link. If multiple links lead to the destination, the data plane processor can select one link based, at least in part, on the cost.

In the illustrated embodiment, a portion 234 of the routing database 230 includes several data items. The included data items shown are interface identification ("interface ID"), data indicating terminal A ("Terminal A"), data indicating cost of reaching terminal A ("Cost A"), data indicating terminal B ("Terminal B"), data indicating cost of reaching terminal B ("Cost B"), and other data (" . . . "). Any method for indicating an interface, a terminal, and a cost may be used. For example, in some embodiments, the terminal is indicated by the network address or the subnet that includes the terminal.

Although the routing database portion 234 shows all the data items together, the data may be stored in any manner. In some embodiments, the data items are stored together in one record of a database. Alternatively, the data items are organized by subnet of the destination, and associated with each destination subnet is an interface ID and a cost. Other subnets reached through the same interface are stored in a different location in the routing database 230.

Although shown outside the data plane processor 210 in FIG. 2, in some embodiments the routing database 230 resides within the data plane processor 210. Further, the routing database may reside within an active one of the control plane processors 220.

Assume, for purposes of illustration, that a subnet for terminals 142a, 142b, 143 is reached from router 110 through the interface on link 120a. Similar assumptions for the other terminals leads to the information shown in Table 1. Table 1 represents example contents of a routing database 230 on router 110.

TABLE 1

Example contents of routing database 230 on router 110.

| Destination Subnet | Interface | Cost |
|---|---|---|
| for 142a, 142b, 143 | on link 120a | C1 |
| for 144a, 144b, 145 | on link 120b | C2 |
| for 146a, 146b, 147 | on link 120c | C3 |
| for 148a, 148b, 149 | on link 120d | C4 |

The peer list data structure 240 ("peer list") holds data that indicates a list of the adjacent routers and terminals linked directly to the router 110; the use of the peer list 240 is described in greater detail with reference to FIG. 3 and FIG. 4. In some embodiments, the peer list 240 indicates nodes of the network that hold data relevant for the restarting node, regardless of whether the nodes are adjacent.

2.3 Functional Overview

According to the illustrated embodiments, when a router restarts a control plane while the data plane is still functioning, the active control processor 220b reconstructs the routing database 230 from messages solicited from the adjacent routers using the information already stored in those adjacent routers. None of the adjacent routers need to reconstruct any routes to update the restarting router. Because no single router holds all the information needed to reconstruct the lost routing database, messages from multiple adjacent routers are coordinated. Further, the possibility that an adjacent router has left the network during the update process is handled. The router with the restarting control plane need not know which routers are adjacent, nor which terminal subnets are involved to start the process. The adjacent routers identify themselves and the destination subnets as part of the process.

In the illustrated embodiments, EIGRP messages are used, but other protocols may be used in other embodiments. Also, in the illustrated embodiments, the messages sent are backward compatible in that adjacent routers that use EIGRP, but that do not support NSF, can still operate using prior approaches.

These embodiments enable a control plane to restart without consuming excess resources on any router and without passing a large amount of excess information over any link during the restart process.

3.0 Method of Synchronizing Databases

A method for synchronizing different databases on different nodes with relevant information for other nodes is provided in the following with reference to FIG. 3, FIG. 4 and FIG. 5 for the context of exchanging control plane messages according to EIGRP.

3.1 Exchanging Relevant Portions of Databases

Figure 3:
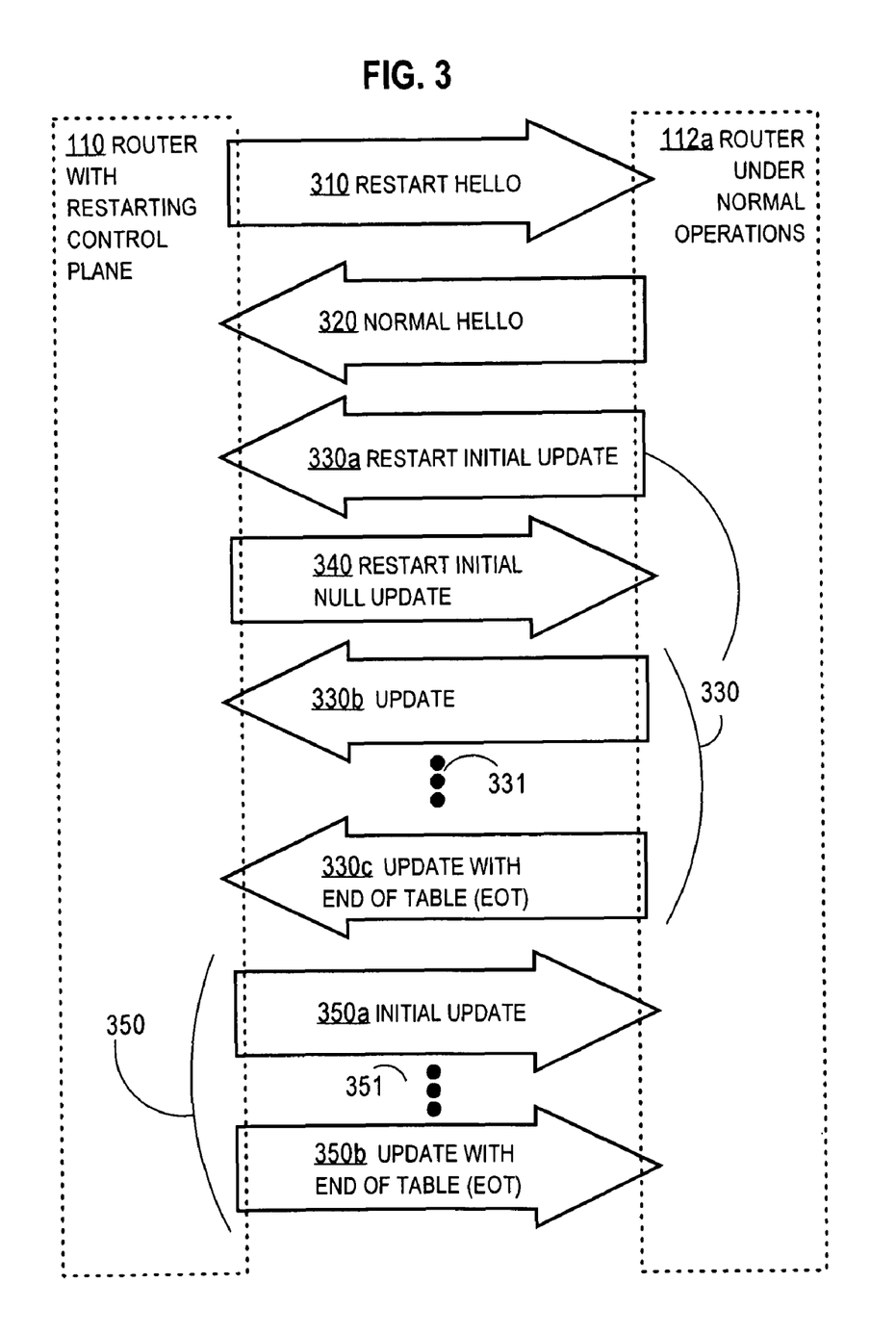
FIG. 3 is a time line diagram that illustrates a sequence of data packets exchanged between a restarting router and an adjacent router, according to an embodiment.

FIG. 3 is a time line diagram that illustrates a sequence of data packets exchanged between a restarting router 110 and an adjacent router 112a, according to an embodiment. In FIG. 3, time progresses downward in the diagram.

Assume that at time t0, the control plane processor 220a goes down and loses or contaminates the data stored in routing database 230. Control plane processor 220b becomes active to replace control plane processor 220a but the validity of the routing database is unknown. The data plane processor 210 continues to process data packets. If the data packets are directed to the control plane 220, then the data plane processor 210 passes those packets to active control plane processor 220b. If the data packets are directed to a destination, then the data plane processor uses a mapping based on the old, possibly invalid, routing database 230 to forward the data packet.

At time t1, after time t0, the router 110 sends a modified EIGRP hello message 310 ("Restart Hello") and starts an NSF signal timer. The NSF signal timer starts a window during which initial contact is made with all the adjacent routers. The modified EIGRP hello message 310 includes a restart bit that is set to indicate that a control plane is restarting during NSF to routers that are configured for NSF restarts; such routers are hereinafter called "NSF aware" routers. The restart bit is undefined and ignored by routers that are not configured for NSF restarts; such routers are hereinafter called "non-NSF aware" routers.

The EIGRP hello message identifies the sending router and indicates that the sending router needs routing information. The modified EIGRP hello message 310 is multicast from router 110; thus, the modified EIGRP hello message 310 is sent out over every interface of the router 110 and thus along the links on those interfaces. In the illustrated embodiment, the modified EIGRP hello message 310 is sent along links 120a, 120b, 120c, 120d to a set of candidate routers that includes only the adjacent routers. In some embodiments, the messages may be repeated by the adjacent routers and thus sent to a set of candidate routers beyond the adjacent routers. FIG. 3 depicts the modified EIGRP hello message 310 sent along link 120a to adjacent router 112a.

When the modified EIGRP hello message is received by an adjacent router, the adjacent router determines the particular interface through which the message arrived. In the routing database on the adjacent router there is a particular portion that is associated with that particular interface. If the adjacent router is a non-NSF aware router, or if the restart bit in the hello message is not set, the adjacent router discards the information associated with that particular interface. The adjacent router then starts the processes to discover routes through the particular interface or to discover new routes to destinations subnets formerly available through that interface.

However, when the modified EIGRP hello message is received by a NSF-aware adjacent router, such as adjacent router 112a, the adjacent router 112a keeps the information associated with the particular interface on link 120a. In addition, the adjacent router 112a prepares to send information to the restarting router 110 from other portions of the routing database, which portions are relevant for the restarting router 110. This information includes data about the subnets that can be reached by the receiving router 112a.

In the illustrated embodiment, router 112a is a NSF aware router that receives a hello message from router 110 with the restart bit set. Therefore, the router 112a retains the portion of data in its routing database about the interface on link 120a and prepares to send other information to router 110 about the destination subnets that can be reached over its other interfaces, such as the interfaces on link 122a to router 112b and the interfaces connected to routers 132. The destination subnets that can be reached through adjacent router 112a include the subnet for terminals 142a, 142b, 143 at one cost, and the subnet for terminals 144a, 144b, 145 at another cost.

At time t2, after time t1, the adjacent router 112a sends a normal EIGRP hello response message 320 back to the restarting router 110. The message 320 indicates that a router received the message 310 and that the router that received the message 310 has a particular router identity, using any known method for identifying a router, such as a router name, a logical network address, or a media access control address. In some embodiments, a return hello message 320 is sent only after a hello timer expires after a first hello message 310 is received, so that all routers coming on line announce themselves before the node 112a responds. In the illustrated embodiment, when the restart bit is set, the hello timer is automatically expired, to decrease the wait for the restarting router 110 to obtain information relevant for reconstructing its routing database 230.

The restarting router 110 receives the hello message 320 from the adjacent router and adds the data identifying the router to a list of peer routers in the peer list 240.

At time t3, after time t2, the adjacent router 112a sends the first data packet 330a in a series 330 of one or more data packets that contain a portion of the information in the routing database that is relevant to the restarting router. In particular, router 112a sends a modified EIGRP update data packet with the INIT bit set and the restart bit set. The INIT bit is set by both NSF aware and non-NSF aware routers to indicate the first packet 330a of a series 330 of update packets. The restart bit is set only by NSF aware routers and indicates to the restarting router 110 that the responding router 112a is a NSF aware router. When the restarting router 110 receives the restart initial update message 330a, the restarting router 110 marks the adjacent router 112a as a NSF aware router in the peer list 240.

At time t4, after time t2, and sometimes before time t3, the restarting router 110 sends a modified EIGRP update message 340 with an INIT bit set and the restart bit set. The message indicates an update for the routing database of the router 112a, but includes no update data yet. Because no update data is included, the data packet 340 is called a null update data packet. The message is used to cause the router 112a to set a timer, called hereinafter a "peer-wait" timer, which starts a temporal window during which the adjacent router 112a can expect any updates from the restarting router 110.

At time t5, after time t3, the next data packet 330b of the series 330 of update data packets is received. Other update data packets, if any, are indicated by ellipsis 331. At time t6, after time t5, the last data packet 330c of the series 330 of update data packets is received. The data packet 330c is marked as the last data packet by including data indicating an end of table (EOT) condition in the data packet 330c. EIGRP update data packets are used for data packets 330b, 330c, and others indicated by ellipsis 331. In the illustrated embodiment, the series 330 includes portions of the routing database on adjacent router 112a that indicates the destination subnet for terminals 142a, 142b, 143 at cost C5, and the destination subnet for terminals 144a, 144b, 145 at cost C6. The restarting router determines an increased cost by adding another hop from the adjacent router 112a to the restarting router 110, and assembles two portions for the routing database 230 based on this update data. Table 2 gives the two portions generated.

TABLE 2

Example portions of routing database 230 on router 110 based on updates from adjacent router 112a.

| Destination Subnet | Interface | Cost |
|---|---|---|
| for 142a, 142b, 143 | on link 120a | C5 + 1 hop = C1 |
| for 144a, 144b, 145 | on link 120a | C6 + 1 hop |

The restarting router 110 waits a reasonable time for the series of update data packets to be received from all the adjacent peers. The restarting router 110 first waits for the NSF signal timer to expire, to ensure that all adjacent peers have had an opportunity to send a hello response and to be included in the list of peers in the peer list 240. When the NSF signal timer expires at time t7, after time t2 but sometimes before time t6, a NSF converge timer is set. When the NSF converge timer expires at time t8, after time t7, but sometimes before time t6, the restarting router 110 no longer waits for the last data packet from each adjacent router in the peer list 240.

In the illustrated embodiment, the updates from the adjacent routers 112b, 112c, 112d are received before the converge timer expires. Those updates indicate, respectively, the destination subnet for terminals 144a, 144b, 145 at cost C7, the destination subnet for terminals 146a, 146b, 147 at cost C8, and the destination subnet for terminals 148a, 148b, 149 at cost C9. After time t8, the restarting router 110 reconstructs the routing database 230 from the relevant information in the series of updates. It is assumed, for purposes of illustration, that cost C7 is less than cost C6, so that the route to destination subnet 144a, 144b through 112b supplants the route through 112a. The reconstructed routing database 230 for the illustrated embodiment is shown in Table 3.

TABLE 3

Example reconstructed routing database 230 on router 110 based on updates from adjacent routers 112a, 112b, 112c, 112d.

| Destination Subnet | Interface | Cost |
|---|---|---|
| for 142a, 142b, 143 | on link 120a | C5 + 1 hop = C1 |
| for 144a, 144b, 145 | on link 120b | C7 + 1 hop = C2 |
| for 146a, 146b, 147 | on link 120c | C8 + 1 hop = C3 |
| for 148a, 148b, 149 | on link 120d | C9 + 1 hop = C4 |

Thus, Table 3 represents a complete reconstruction of the routing database. Some routers may include information in their routing databases that are passed through a different routing protocol. In such embodiments, the EIGRP notifies the routing database manager that EIGRP has converged and waits for the routing database to signal at time t9, after time t8, that all protocols have converged.

At time t10, after time t9, the relevant routes available through the restarted router 110 are sent to the adjacent routers in a series of EIGRP update data packets. In some embodiments, the relevant routes exclude the routes on links through the adjacent router to which the updates are sent. For example, in the illustrated embodiment, only the portion in Table 3 depicted in the last three rows is relevant for updating adjacent router 112a from restarting router 110. Adjacent router 112a already knows the information in the first row because that information came from adjacent router 112a in the series 330 of update messages. At time t10, the initial update 350a is sent, which is the first of a series 350 of update packets that includes packets 350a, 350b, and any additional packets indicated by ellipsis 351.

At time t11, after time t10, the last update data packet 350b, with data indicating an end of table, is sent. When the last update data packet 350b with the data indicating end of table (EOT) is received by the adjacent router 112a; or when the peer wait timer set when data packet 340 was received, expires, whichever occurs first, the adjacent router determines whether to change any data in its own routing database based on the series 350 of data packets. Updating the routing database on adjacent router 112a is described in more detail in a later section with reference to FIG. 5.

3.2 Process of Restarting a Control Plane at a Router

Figure 4:
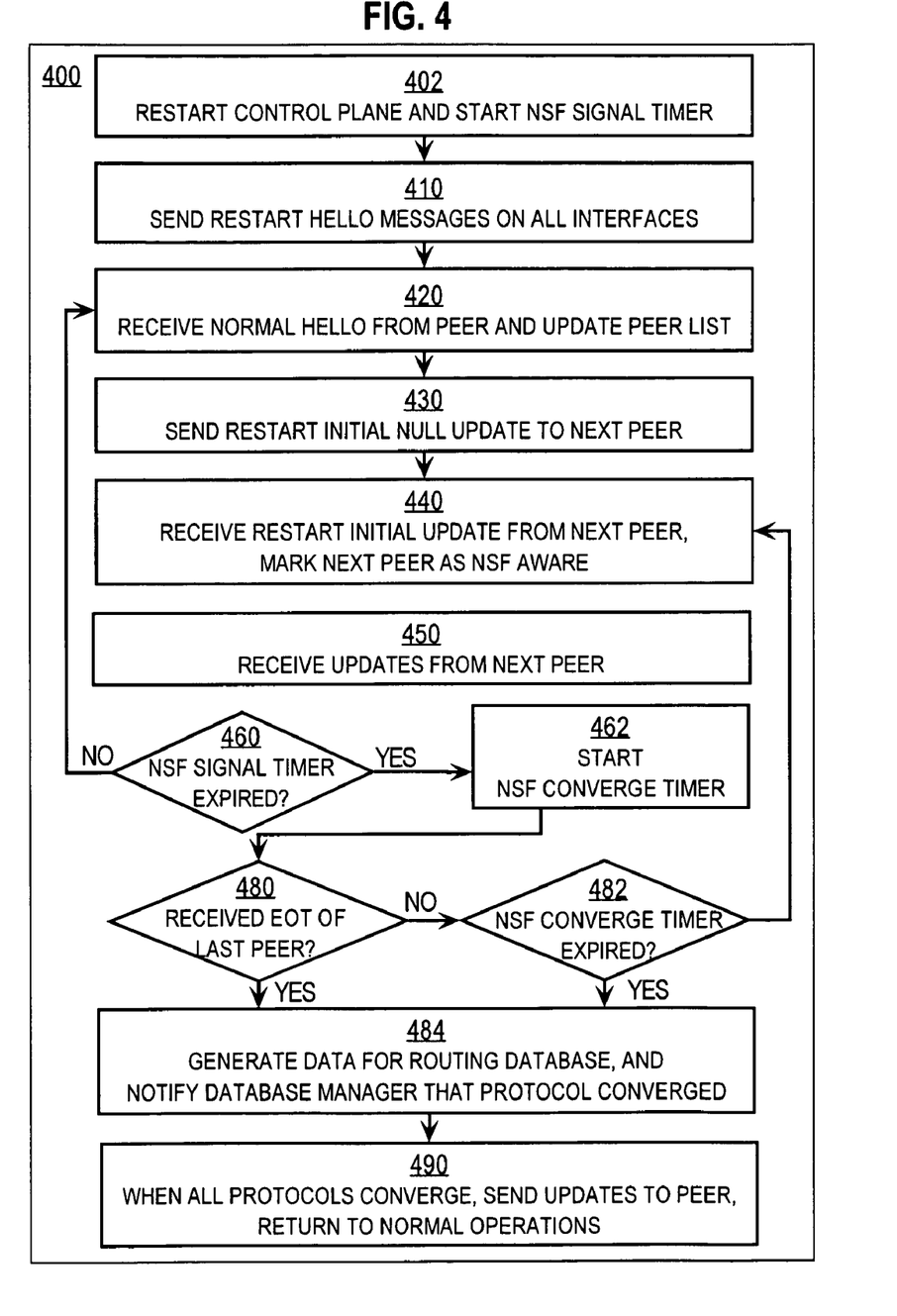
FIG. 4 is a flow diagram that illustrates a high level overview of one embodiment of a method for synchronizing control data at a restarting router.

FIG. 4 is a flow diagram that illustrates a high level overview of one embodiment of a method 400 for synchronizing a database at a restarting router. Though the steps illustrated in FIG. 4 and FIG. 5 are depicted in a particular order, in other embodiments the steps may be performed in a different order or overlapping in time.

Assume, for purposes of illustration, that the routing databases at the adjacent routers 112a, 112b, 112c, 112d include portions as given in Tables 4a, 4b, 4c, 4d, respectively. In the illustrated embodiment, a timestamp is associated with each route in the routing database. The timestamp indicates when the data for the corresponding route was most recently included in an update.

TABLE 4a

Example portions of routing database on router 112a.

| Destination Subnet | Interface | Cost | Timestamp |
|---|---|---|---|
| for 142a, 142b, 143 | on link to 132 | CA1 | tA1 |
| for 144a, 144b, 145 | on link 122a | CA2 | tA2 |
| for 146a, 146b, 147 | on link 120a | CA3 | tA3 |
| for 148a, 148b, 149 | on link 120a | CA4 | tA4 |

TABLE 4b

Example portions of routing database on router 112b.

| Destination Subnet | Interface | Cost | Timestamp |
|---|---|---|---|
| for 142a, 142b, 143 | on link 122a | CB1 | tB1 |
| for 144a, 144b, 145 | on link to 134 | CB2 | tB2 |
| for 146a, 146b, 147 | on link 120b | CB3 | tB3 |
| for 148a, 148b, 149 | on link 122b | CB4 | tB4 |

TABLE 4c

Example portions of routing database on router 112c.

| Destination Subnet | Interface | Cost | Timestamp |
|---|---|---|---|
| for 142a, 142b, 143 | on link 120c | CC1 | tC1 |
| for 144a, 144b, 145 | on link 120c | CC2 | tC2 |
| for 146a, 146b, 147 | on link to 136 | CC3 | tC3 |
| for 148a, 148b, 149 | on link 122c | CC4 | tC4 |

TABLE 4d

Example portions of routing database on router 112d.

| Destination Subnet | Interface | Cost | Timestamp |
|---|---|---|---|
| for 142a, 142b, 143 | on link 120d | CD1 | tD1 |
| for 144a, 144b, 145 | on link 122b | CD2 | tD2 |
| for 146a, 146b, 147 | on link 122c | CD3 | tD3 |
| for 148a, 148b, 149 | on link to 138 | CD4 | tD4 |

In step 402, a control plane restarts on a router. In some embodiments, a router with a single control plane restarts that control plane; in other embodiments, a second control plane starts. An NSF signal timer is started. Any method for starting a timer may be used. In an illustrated embodiment, the NSF signal timer is a register that is started with a count that corresponds to 20 seconds; the counter is decremented every computational cycle; and the timer expires when the count reaches zero. The NSF signal timer defines a time window during which the restarting router determines which of its interfaces are linked to routers with routing databases that have portions that are relevant for the restarting control plane. In the illustrated embodiment, control plane processor 220b restarts on router 110 as a replacement for failed control plane processor 220a. At this step, the routing database 230 and the peer list 240 on restarting router 110 are empty.

In step 410, a restart hello message is sent out on all interfaces. For example, in the illustrated embodiment, an EIGRP hello data packet 310 with the restart bit set is sent out on all interfaces of router 110 to all adjacent nodes 112a, 112b, 112c, 112d on links 120a, 120b, 120c, 120d, respectively. In some embodiments, a message to determine nodes with relevant information is sent to a candidate set of nodes that includes at least the nodes with relevant information. In some embodiments, the candidate set includes only the adjacent nodes; in some embodiments the candidate set includes nodes that are not adjacent nodes.

In step 420, a hello response message is received from an adjacent router with relevant information for the restarting router. A node with information relevant for the restarting node is called herein, a "peer." In the illustrated embodiment, the restarting router 110 receives an EIGRP normal hello data packet from any of its peers 112a, 112b, 112c, 112d. For purposes of illustration, it is assumed that the first hello message received by restarting router 110 is from adjacent router 112a. Upon receiving the hello message, the restarting router 110 adds a reference for the router 112a to the peer list 240 during step 420. Any method may be used to indicate a peer in the peer list; for example a unique peer name, or a peer network address included in the hello message may be used to indicate the peer in the peer list. In the illustrated embodiment, an interface name connected to the peer through a link is included in the peer list with the network address of the peer; for example the interface on link 120a is associated with the network address of peer 112a in the peer list 240.

In step 430, the restarting router sends a restart initial null update message to the next peer in peer list 240. In the illustrated embodiment, the restarting router 110 sends EIGRP restart initial null update data packet 340 to peer 112a. The INIT bit in the EIGRP data packet is set to indicate that the sending router 110 is an adjacent router to the receiving router 112a, and that router 110 wants the relevant portions of the routing database on router 112a. The restart bit is set to indicate that the sending router 110 is restarting so that identification for router 110 is already included in the peer list on router 112a, and data that indicates routes through router 110 is included in the routing database on router 112a. In some embodiments, all peers send update information automatically upon receiving the restart hello message sent in step 410, and step 430 may be omitted.

In step 440, the restarting router receives the first of a series of one or more messages with update data relevant for the restarting router. In the illustrated embodiment, the router 110 receives a modified EIGRP initial update data packet 330a. The INIT bit in the EIGRP data packet is set to indicate that the sending router 112a is an adjacent router to the receiving router 112a, and that router 110 is to receive the relevant portions of the routing database on router 112a. The restart bit is set to indicate that the sending router 112a is NSF aware, so that the sending router 112a announces it is sending data already in it, rather than initiating the non NSF startup process to discover routes among all the nodes in the network. During step 440, the restarting router 110 marks the peer 112a in the peer list 240 as NSF aware.

In step 450, more update messages, if any, are received from the next peer. In embodiments in which the update is contained in the first message received in step 440, step 450 may be omitted. In the illustrated embodiment, step 450 involves receiving the EIGRP update data packet 330b, and packets 331, if any, and packet 330c with data that indicates end of table. In some embodiments, steps 440 and 450 include receiving, at restarting router 110, all the data in Table 4a from router 112a. In the illustrated embodiment, steps 440 and 450 include receiving only the relevant information in table 4a, which excludes the portion indicated by the third and fourth rows of Table 4a. The portions indicated by the third and fourth rows of Table 4a are routes that go from adjacent router 112a to restarting router 110. These routes are expected to depend on information that router 110 obtains from the other peers, not from peer 112a.

In step 460, it is determined whether the NSF signal timer has expired. If not, control passes back to step 420 to await hello messages from other peers. It is assumed, for purposes of illustration, that router 112c has left the network 100 since router 110 lost its first control plane processor 220a. Among the consequences of router 112c leaving the network is that router 112c does not send a hello message before the NSF signal timer expires in step 460. Therefore, in the illustrated embodiment, hello messages are received from peers 112b and 112d before the NSF signal expires, but not from router 112c. Therefore the peer list 240 includes data indicating the network addresses of routers 112a, 112b and 112d but not router 112c. When the NSF signal timer expires, control passes to step 462.

In step 462, a NSF converge timer is started. Any method for starting a timer may be used. In an illustrated embodiment, the NSF converge timer is a register that is started with a count that corresponds to 180 seconds; the counter is decremented every computational cycle; and the timer expires when the count reaches zero. The NSF converge timer defines a time window during which the restarting router waits for update messages from peers in the peer list 240.

In step 480, it is determined whether the message with the data indicating the end of table is received for every peer in the peer list. If so, the update of the routing table 230 on router 110 is complete, and control passes to step 484, described below. If not, control passes to step 482.

In step 482, it is determined whether the NSF converge signal has expired. If not, control passes back to step 440 to receive update messages from other peers on the peer list that have not yet sent updates that include the data indicating end of table. In the illustrated embodiment, during the next iterations through the loop represented by steps 440 through 482, the relevant data from peers 112a, 112b, 112d are received at restarting router 110. For example, the portions of the routing database on router 112b represented by rows 1, 2 and 4 of Table 4b are received.

Another consequence of router 112c leaving the network is that row 3 of Table 4d is dropped from the routing database on router 112d. Therefore, only the portions of the routing database on router 112d represented by rows 2 and 4 of Table 4d are received.

In step 480 it is determined that the end of table has been received for the last peer in the peer table.

If the NSF converge timer has expired, then control passes from step 482 to step 484, even though the end of table data has not been received for all the peers in the peer list 240. For example, if the portion of the routing database on router 112d represented by row 4 of Table 4d is not received before the NSF converge timer expires, control passes to step 484 anyway.

In step 484, the routing database on the restarting router has converged according to the protocol that performed steps 410 through 484. Step 484 includes generating entries for the routing database based on the updates received during these steps. In some embodiments, step 484 overlaps with the loop from 440 through 482, so that the data is inserted into the routing database as updates are received from the peers.

Portions of the routing database derived from the updates received in these steps are shown in Table 5. For purposes of illustration to generate Table 5, it is assumed that the cost of the routes shown in Table 5 are less than the costs of routes to the same destination through other interfaces on other links to other peers. Table 5 also lists the row of the table corresponding to the peer where the portion was obtained. The time stamp t0 represents the time that the routing database 230 is updated, and is later than any of the timestamps listed in Tables 4a, 4b, 4c, 4d.

TABLE 5

Example reconstructed portions of routing database 230 on router 110.

| Destination Subnet | Interface | Cost | Timestamp | sent from |
|---|---|---|---|---|
| for 142a, 142b, 143 | on link 120a | C1 = CA1 + 1 hop | t0 | 112a, row 1 |
| for 144a, 144b, 145 | on link 120b | C2 = CB2 + 1 hop | t0 | 112b, row 2 |
| for 148a, 148b, 149 | on link to 120d | C4 = CD4 + 1 hop | t0 | 112d, row 4 |

Because router 112c has exited the network 100, the routing database 230 on restarting router 110 no longer lists a route to the destination subnet for terminals 146a, 146b, 147.

In step 490, the restarting router sends updates of relevant information to its peers. In other embodiments, the nodes that receive relevant information from the restarting node include nodes that are not adjacent nodes. In some embodiments, all the data in the routing database on the restarting router is sent to all peers in a series of update messages. In the illustrated embodiment, only information relevant to the receiving peer is sent in the series 350 of one or more EIGRP update data packets sent to each peer. For example, rows 2 and 3 of Table 5 are sent to peer 112a; rows 1 and 3 of Table 5 are sent to peer 112b, and rows 1 and 2 of Table 5 are sent to peer 112d. Row 1 of Table 5 is not needed by peer 112a because the route indicated to destination subnet for terminals 142a, 142b, 143 goes through 112a. Thus 112a already knows the lowest cost route to this destination subnet. Similarly, row 2 of Table 5 is not needed by peer 112b, and row 3 of Table 5 is not needed by peer 112d.

The restarting router 110 then resumes normal operations. The active control plane processor 220b pushes any new information in routing database 230 to the data plane processor 210. This includes responding to any requests for non-NSF discovery of routes to the destination subnet for terminals 146a, 146b, 147, as described below regarding FIG. 5.

In some embodiments, more than one protocol is used to share routing database information. In such embodiments, step 490 includes steps to assure that the information in the routing database has converged according to all of the one or more additional protocols. For example, step 490 includes steps to notify the routing database manager that the EIGRP protocol has converged and waiting for a signal from the routing database manager that all protocols have converged before sending the EIGRP update messages.

In the illustrated embodiment, the update messages sent from the restarting router 110 during step 490 do not include data indicating the reset bit is set, so the receiving peer, e.g., router 112a, does not prepare to send updates back to the sending router 110.

3.3 Process of Responding to a Restarting Control Plane at an Adjacent Router

Figure 5:
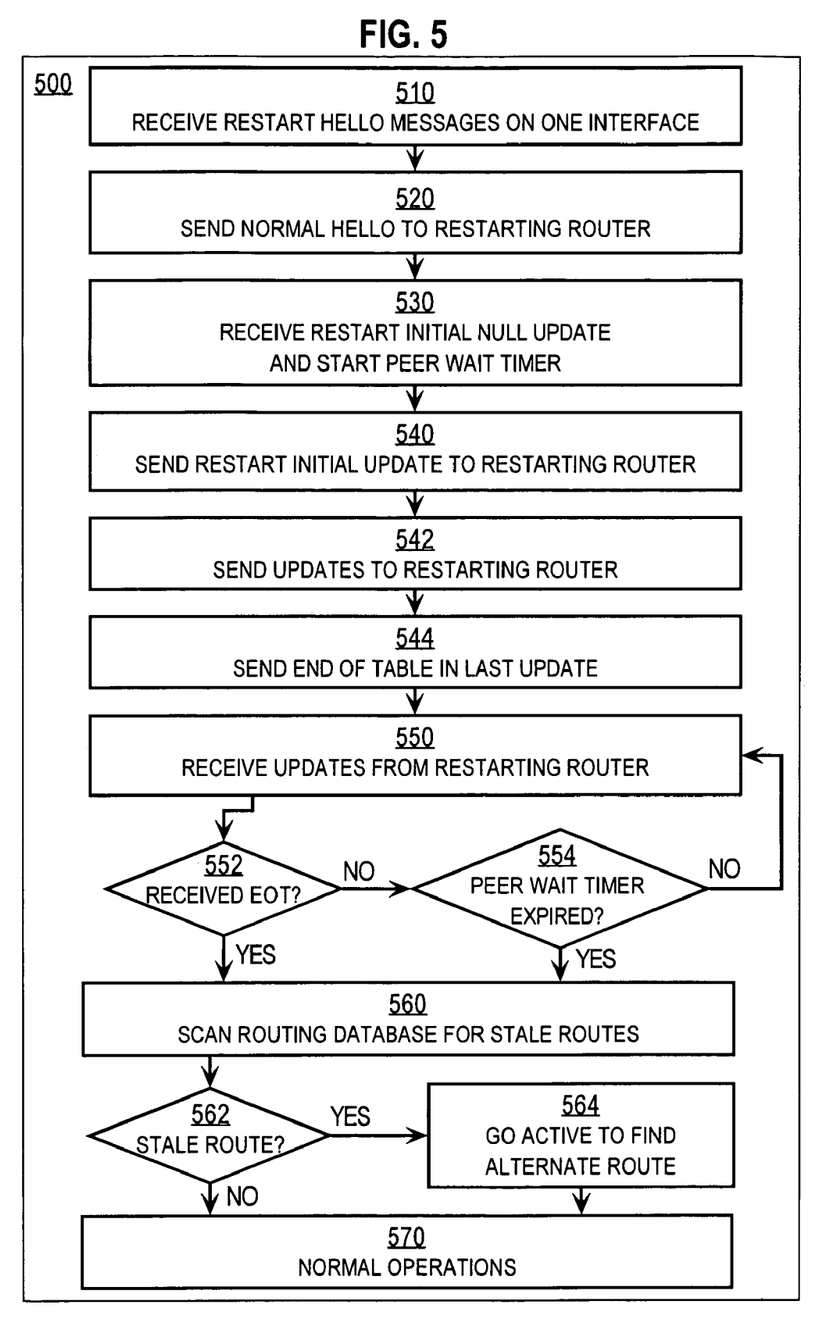
FIG. 5 is a flow diagram that illustrates a high level overview of one embodiment of a method for synchronizing control data at a router adjacent to a restarting router.

FIG. 5 is a flow diagram that illustrates a high level overview of one embodiment of a method 500 for synchronizing a database at a router with information relevant for a restarting router. The method 500 is described for a router adjacent to a restarting router, but any node with data relevant for the restarting node can perform method 500. The illustrated embodiment is described for adjacent router 112a, but similar steps occur at peers 112b, 112d. In some embodiments, any router 130 performs method 400 when that router restarts, and performs method 500 when that router is adjacent to a restarting router.

In step 510, the adjacent router receives the restart hello message on an interface. For example, router 112a receives, on its interface on link 120a, the modified EIGRP hello data packet 310 with a restart bit set.

In step 520, the adjacent router sends a normal hello response to the restarting router. In the illustrated embodiment, the normal EIGRP hello response is sent by both NSF aware and non-NSF aware routers and indicates the router sending the hello response, such as by indicating a network address of the router sending the hello response. An non-NSF aware router waits for a hello timer to expire before responding to a hello message to allow hellos to come in from multiple new routers. In the illustrated embodiment, the adjacent router 112a is a NSF-aware router that resets the hello timer to zero and sends a hello response immediately, in order to accelerate the discovery of peers for the restart steps.

In some embodiments, during step 520, the NSF aware adjacent router also determines whether the restarting router 110 is in the peer list of the adjacent router. If not, the adjacent router uses the non-NSF approach to rediscover routes. If the restarting router is in the peer list, then the adjacent router performs the following steps. In the illustrated embodiment, adjacent router 112a determines that restarting router 110 is in the peer list of adjacent router 112a and passes control to the following steps.

In step 530 a restart initial null update message is received and a peer wait timer is started. In the illustrated embodiment, the null update message is a modified EIGRP initial null update message with a restart bit set.

Any method for starting a peer wait timer may be used. For example, the peer wait timer is a register that is started with a count that corresponds to 240 seconds; the counter is decremented every computational cycle; and the timer expires when the count reaches zero. The peer wait timer defines a time window during which the NSF aware adjacent router waits for update messages from the restarting router.

In some embodiments, if the restarting router is in the peer list of the adjacent router, then the adjacent router waits for the null update message from the restarting router before sending updates in step 540, described below. In the illustrated embodiment, the adjacent router 112a does not wait for the initial null update message from the restarting router before sending updates in step 540.

In some embodiments, a timestamp when the initial update message is received, or when the restart hello message is received, is used to determine when data in the adjacent routing database for the restarting router becomes stale. In the illustrated embodiment, this timestamp is called herein the "stale timestamp" for restarting router 110.

In step 540, a restart initial update message is sent to the restarting router from the adjacent router. The set restart bit indicates to the restarting router that the adjacent router is NSF aware and is sending data already in the routing database of the adjacent router, rather than starting a non-NSF process to rediscover routes. For example, a modified EIGRP initial update data packet 330a with a restart bit set is sent from adjacent router 112a to restarting router 110.

In step 542, more update messages, if any, are sent to the restarting router from the adjacent router. In the illustrated embodiment, EIGRP update data packets 330b, 331 are sent from adjacent router 112a to restarting router 110.

In step 544, a separate update message, if any, with data indicating end of table, is sent to the restarting router from the adjacent router. This message indicates the end of the relevant data from this adjacent router. In some embodiments, all the updates and the data indicating the end of table are included in the initial update message 330a. In one embodiment, EIGRP update data packets 330c is sent from adjacent router 112a to restarting router 110. This indicates to restarting router 110 that peer 112a has no more data to send relevant to reconstructing the routing database on the restarting router 110.

In one embodiment, the update packets sent in steps 540, 542, 544 carry portions of the routing database on adjacent router 112a relevant to the restarting router, as represented by rows 1 and 2 in Table 4a.

In step 550, the adjacent router begins to receive update messages from the restarting router after the restarting router has reconstructed some or all of its routing database. In one embodiment, the adjacent router 112a receives EIGRP initial update data packet 350a from the restarting router 110 after the restarting router has reconstructed some or all of its routing database 230 during steps 484, 490 shown in FIG. 4.

In step 552, it is determined whether the end of table (EOT) has been received in the update messages. If so, control passes to step 560, described below, to process the updates. If not, control passes to step 554.

In step 554, it is determined whether the peer wait timer has expired. If not, control passes back to step 550 to receive update messages from the restarting router. If so, control passes to step 560 to process the updates even though the end of table has not yet been received.

For purposes of illustration, assume that the relevant rows of Table 5 are received in the update messages during the loop represented by steps 550, 552, 554. For example, the relevant rows of Table 5 are rows 2 and 3 received from peers 112b and 112c.

In step 560, the routing table on the adjacent node is scanned for stale routes. As used herein, a stale route is a route from the adjacent router through the restarting router that is not included among the updates received from the restarting router. In the illustrated embodiment, the routes from the adjacent router 112a through the restarting router 110 use link 120a and are represented in Table 4a by rows 3 and 4. Of these, the route represented in Table 4a by row 3, to destination subnets for terminal 146 etc., is not included in rows 2 and 3 of Table 5, which are directed to destination subnets for terminals 144a etc., and 148a etc., respectively. Therefore row 3 in Table 4a represents a stale node.

In one embodiment, step 560 includes replacing routes in the routing database with updated routes and resetting the timestamp associated with the route to the time when the updated route was written. Table 6 represents the updated routing database on router 112a. For purposes of illustration, assume that the route to destination subnet for terminals 144a etc. is not updated because the cost (C2+1 hop=CB2+2 hops) of going through router 110 is greater than the cost (CA2=CB2+1 hop) of going through router 112b.

TABLE 6

Example updated portions of routing database on router 112a.

| Destination Subnet | Interface | Cost | Timestamp |
|---|---|---|---|
| for 142a, 142b, 143 | on link to 132 | CA1 | tA1 |
| for 144a, 144b, 145 | on link 122a | CA2 | tA2 |
| for 146a, 146b, 147 | on link 120a | CA3 | tA3 |
| for 148a, 148b, 149 | on link 120a | C4 + 1 hop | t10 |

Table 6 shows that only the portion of the routing database represented by row 4 is updated and consequently the timestamp in row 4 is updated from tA4 to t10. Timestamps tA1, tA2, tA3, tA4 precede the stale timestamp, which indicates the time when the restart hello message was received in step 510 or when the restart initial null update was received in step 540. Timestamp t10 follows the times stale timestamp. The data in the routing database of router 112a for the restarting router 110 with a timestamp before the time of step 510 is stale routing data. In the illustrated embodiment, the portion represented by row 3 of Table 6 is on link 120a through restarting router 110 and has a timestamp before step 510 occurs; therefore, the portion represented by row 3 of Table 6 is stale.

In this embodiment, step 560 includes scanning each portion of the routing database on the adjacent router that goes through the restarting router and comparing the timestamp to the stale timestamp.

In step 562 it is determined whether any stale routes are found. If not, control passes to step 570 to resume normal operations. If so, control passes to step 564 to go active with a non-NSF process to discover routes to the destination subnets with stale routes. In the illustrated embodiment, control passes to step 564 to use the non-NSF process to discover routes to the destination subnets 146a, etc. If any of routers 136 is linked to any of routers 132, 134, or 138, then another route can be found to the destination subnet of terminals 146a, etc. using the non-NSF process.

In step 570, normal operations resume at the adjacent router. For example, normal operations resume at router 112a.

4.0 Implementation Mechanisms—Hardware Overview

Figure 6:
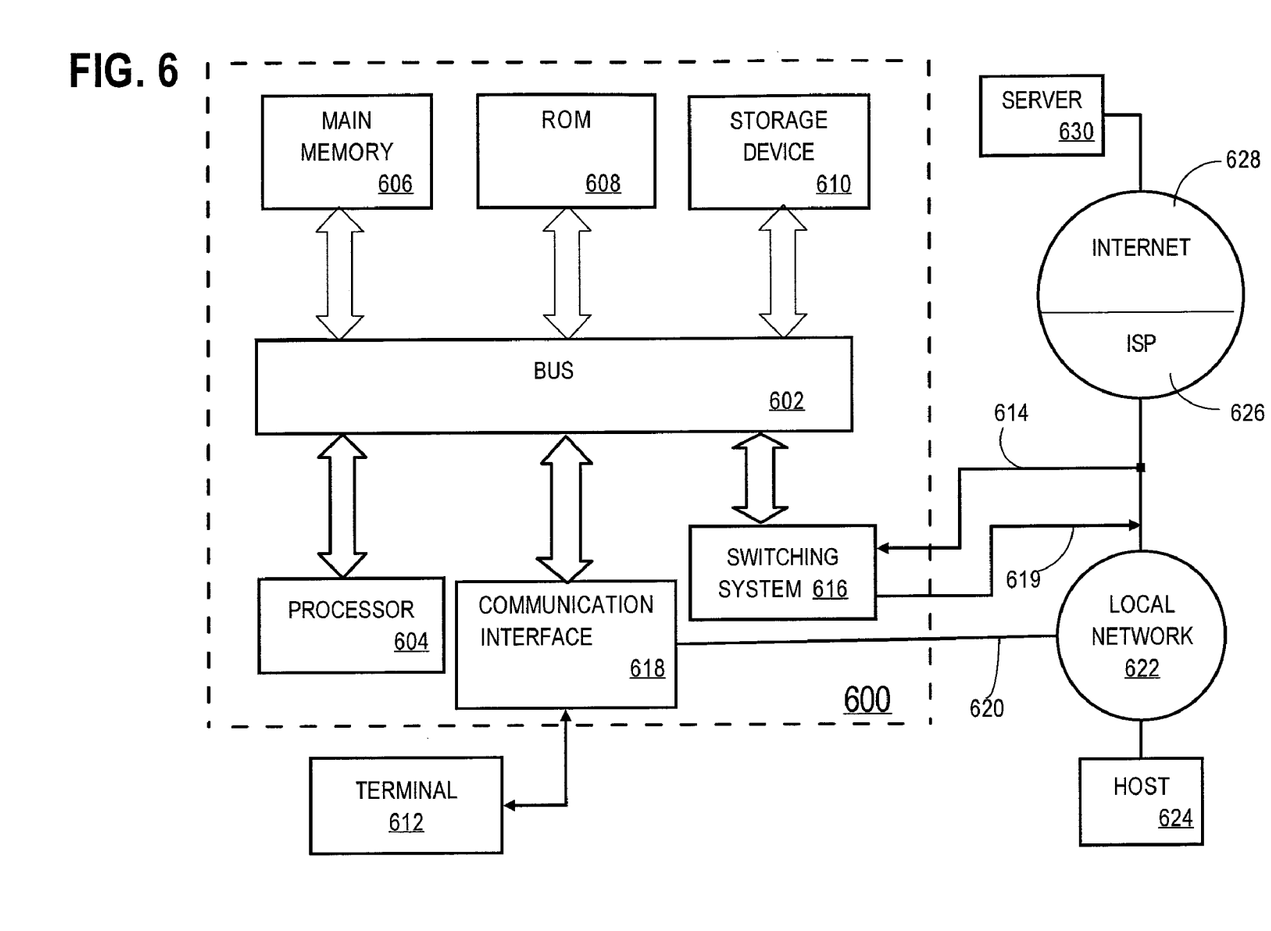
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

An communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for synchronizing a database on a node in a network with a different database on each node. According to one embodiment of the invention, synchronization is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for synchronizing a database on a node of a network with a different database on each node, as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable non-transitory storage medium storing one or more sequences of instructions for synchronizing a database on a first node of a plurality of nodes in a network, wherein each node includes a database different from a database on a different node, which instructions, when executed by one or more processors, cause the one or more processors to perform:
   sending an inquiry control message to each node in a candidate set of one or more nodes on the network different from the first node;
   wherein the inquiry control message requests a routing information base (RIB) for the first node;
   wherein the RIB for the first node is stored in routing databases of nodes of the candidate set different from the first node;
   in response to the inquiry control message, receiving, from a particular node, different from the first node, a first set of one or more messages which indicates a particular portion of the RIB for the first node from a routing database of the particular node, which particular portion is relevant for the first node; and
   after receiving a plurality of messages from nodes in the candidate set of one or more nodes, reconstructing the RIB for the first node from the plurality of messages.

2. The storage medium as recited in claim 1, further comprising instructions which when executed cause performing determining whether a condition for recovering the first database has been satisfied; if it is determined that the condition for recovering the first database has been satisfied, then sending a second set of one or more messages to the particular node, wherein the second set includes a portion from the first database, and the portion from the first database is relevant for the particular node.

3. The storage medium as recited in claim 1, wherein the instructions for sending an inquiry control message to each node in the candidate set comprise instructions for sending an inquiry control message only to each node that is a neighbor of the first node in the network.

4. The storage medium as recited in claim 1, wherein the inquiry control message includes data that indicates database recovery for a node already participating in communications on the network.

5. The storage medium as recited in claim 4, wherein the first node is a router; the inquiry control message is a modified hello message in a router control protocol, which requests data identifying neighbors of the router.

6. The storage medium as recited in claim 1, wherein the nodes are routers; the first set of one or more messages is an update stream in a router control protocol, which sends routes associated with the particular node.

7. The storage medium as recited in claim 1, wherein the first set of one or more messages includes data that indicates database recovery for a node already participating in communications on the network.

8. The storage medium as recited in claim 1, wherein the first node is a first router; the particular node is a different router that holds a database indicating a set of one or more routes of the different router through the first router; the portion relevant for the first node indicates a route of the different router that is not in the set of one or more routes of the different router through the first router.

9. The storage medium as recited in claim 1, wherein the first node is a first router; the instructions for deriving a particular portion of the first database from the first set of messages further comprise instructions which when executed cause associating a route indicated in the set of messages with the particular node.

10. The storage medium as recited in claim 2, wherein the instructions that cause determining whether the condition for recovering the first database has been satisfied further comprise instructions which when executed cause determining whether a set of one or more messages may be received from each node that includes in the database for the node a portion that is relevant for the first node.

11. The storage medium as recited in claim 2, wherein the instructions which when executed cause determining whether conditions for recovering the first database have been satisfied further comprise instructions which when executed cause adding to a peer list, within a first time of a start time when the inquiry control message is sent, data indicating each node which sends a set of one or more messages which indicates a portion from the database of the node, which portion is relevant for the first node; determining whether the set of one or more messages from each node listed in the peer list is complete.

12. The storage medium as recited in claim 11, wherein the instructions which when executed cause determining whether a set of one or more control response messages from each node listed in the peer list has completed comprise instructions which when executed cause determining whether data indicating an end of the set has been received in the set of one or more messages from each node listed in the peer list.

13. The storage medium as recited in claim 12, wherein the instructions which when executed cause determining whether a set of one or more control response messages from each node listed in the peer list has completed comprise instructions which when executed cause determining whether a second time has passed since the first time passed after the start time.

14. In a network including a plurality of nodes, wherein each node includes a database different from a database on a different node, a method for synchronizing data relevant for a first node of the plurality of nodes, the method comprising the computer-implemented steps of:
   receiving, at a second node on the network, an inquiry control message from the first node;
   wherein the inquiry control message requests a routing information base (RIB) for the first node;

wherein the RIB for the first node is stored in a routing database of the second node;

in response to receiving the inquiry control message, sending a first set of one or more messages which indicates a particular portion of the RIB for the first node from the routing database of the second node, which particular portion is relevant for the first node;

wherein the first node, after receiving a plurality of messages from nodes in a candidate set of one or more nodes, reconstructs the RIB for the first node from the plurality of messages;

wherein the method is performed by one or more processors.

15. A method as recited in claim 14, further comprising the computer-implemented step of receiving, at the second node when a condition for recovering the first database has been satisfied, a second set of one or more messages from the first node, wherein the second set includes a portion from the first database; the portion from the first database is relevant for the second node.

16. A method as recited in claim 14, wherein the second node is a neighbor of the first node in the network.

17. A method as recited in claim 14, wherein the inquiry control message includes data that indicates database recovery for a node already participating in communications on the network.

18. A method as recited in claim 17, wherein the first node is a router device; the inquiry control message is a modified hello message in a router control protocol, which requests data identifying neighbors of the router device.

19. A method as recited in claim 14, wherein the nodes are routers; and the first set of one or more messages is an update stream in a router control protocol, which sends routes associated with the sending node.

20. A method as recited in claim 14, wherein the first set of one or more messages includes data that indicates database recovery for a node already participating in communications on the network.

21. The method as recited in claim 14, wherein the first node is a first router; the second node is a different second router that holds a database indicating a set of one or more routes of the second router through the first router; the control information relevant for the first node indicates a route of the second router that is not in the set of one or more routes of the second router through the first router.

22. A method as recited in claim 14, said step of sending the first set of one or more messages further comprising including data indicating an end of the set in a last message of the first set of one or more messages.

23. A computer-readable non-transitory storage medium storing one or more sequences of instructions for synchronizing a database on a first node of a plurality of nodes in a network, wherein each node includes a database different from a database on a different node, which instructions, when executed by one or more processors, cause the one or more processors to perform:

receiving, at a second node on the network, an inquiry control message from the first node;

wherein the inquiry control message requests a routing information base (RIB) for the first node;

wherein the RIB for the first node is stored in a routing database of the second node;

in response to receiving the inquiry control message, sending a first set of one or more messages which indicates a particular portion of the RIB for the first node from the routing database of the second node, which particular portion is relevant for the first node;

wherein the first node, after receiving a plurality of messages from nodes in a candidate set of one or more node, reconstructs the RIB for the first node from the plurality of messages.

24. The storage medium as recited in claim 23, further storing instructions, which when executed, cause the one or more processors to perform receiving, at the second node when a condition for recovering the first database has been satisfied, a second set of one or more messages from the first node, wherein the second set includes a portion from the first database; the portion from the first database is relevant for the second node.

25. The storage medium as recited in claim 23, wherein the second node is a neighbor of the first node in the network.

26. The storage medium as recited in claim 23, wherein the inquiry control message includes data that indicates database recovery for a node already participating in communications on the network.

27. The storage medium as recited in claim 23, wherein the nodes are routers; and the first set of one or more messages is an update stream in a router control protocol, which sends routes associated with the sending node.

28. The storage medium as recited in claim 23, wherein the first set of one or more messages includes data that indicates database recovery for a node already participating in communications on the network.

29. The storage medium as recited in claim 23, wherein the first node is a first router; the second node is a different second router that holds a database indicating a set of one or more routes of the second router through the first router; the control information relevant for the first node indicates a route of the second router that is not in the set of one or more routes of the second router through the first router.

30. The storage medium as recited in claim 23, wherein the instructions for sending the first set of one or more messages further comprise instructions, which when executed, cause the one or more processors to perform including data indicating an end of the set in a last message of the first set of one or more messages.

31. An apparatus for synchronizing a database on a first node of a plurality of nodes in a network, wherein each node includes a database different from a database on a different node, comprising:

one or more processors;

means for receiving, at a second node on the network, an inquiry control message from the first node;

wherein the inquiry control message requests a routing information base (RIB) for the first node;

wherein the RIB for the first node is stored in a routing database of the second node;

means for sending a first set of one or more messages which indicates a particular portion of the RIB for the first node from the routing database of the second node in response to receiving the inquiry control message, which particular portion is relevant for the first node;

wherein the first node, after receiving a plurality of messages from nodes in a candidate set of one or more nodes, reconstructs the RIB for the first node from the plurality of messages.

32. An apparatus for synchronizing a database on a first node of a plurality of nodes in a network, wherein each node includes a database different from a database on a different node, comprising:

a network interface that is coupled to the network for communicating one or more packet flows therewith;

a first processor;

a computer-readable non-transitory storage medium storing one or more sequences of instructions which, when executed by the first processor, cause the first processor to perform:
  receiving, at a second node on the network, an inquiry control message from the first node;
  wherein the inquiry control message requests a routing information base (RIB) for the first node;
  wherein the RIB for the first node is stored in a routing database of the second node;
  in response to receiving the inquiry control message, sending a first set of one or more messages which indicates a particular portion of the RIB for the first node from the routing database of the second node, which particular portion is relevant for the first node;
  wherein the first node, after receiving a plurality of messages from nodes in a candidate set of one or more nodes, reconstructs the RIB for the first node from the plurality of messages.

33. The apparatus as recited in claim 32, the storage medium further comprising instructions which when executed cause receiving, at the second node when a condition for recovering the first database has been satisfied, a second set of one or more messages from the first node, wherein the second set includes a portion from the first database; the portion from the first database is relevant for the second node.

34. The apparatus as recited in claim 32, wherein the second node is a neighbor of the first node in the network.

35. The apparatus as recited in claim 32, wherein the inquiry control message includes data that indicates database recovery for a node already participating in communications on the network.

36. The apparatus as recited in claim 32, wherein the nodes are routers; and the first set of one or more messages is an update stream in a router control protocol, which sends routes associated with the sending node.

37. The apparatus as recited in claim 32, wherein the first set of one or more messages includes data that indicates database recovery for a node already participating in communications on the network.

38. The apparatus as recited in claim 32, wherein the first node is a first router; the second node is a different second router that holds a database indicating a set of one or more routes of the second router through the first router; the control information relevant for the first node indicates a route of the second router that is not in the set of one or more routes of the second router through the first router.

39. The apparatus as recited in claim 32, wherein the instructions for sending the first set of one or more messages further comprise instructions, which when executed, cause the one or more processors to perform including data indicating an end of the set in a last message of the first set of one or more messages.

40. The apparatus as recited in claim 31, further comprising:
  means for receiving, at the second node when a condition for recovering the first database has been satisfied, a second set of one or more messages from the first node, wherein the second set includes a portion from the first database; the portion from the first database is relevant for the second node.

41. The apparatus as recited in claim 31, wherein the second node is a neighbor of the first node in the network.

42. The apparatus as recited in claim 31, wherein the inquiry control message includes data that indicates database recovery for a node already participating in communications on the network.

43. The apparatus as recited in claim 31, wherein the nodes are routers; and the first set of one or more messages is an update stream in a router control protocol, which sends routes associated with the sending node.

44. The apparatus as recited in claim 31, wherein the first set of one or more messages includes data that indicates database recovery for a node already participating in communications on the network.

* * * * *